(12) United States Patent
Brignac et al.

(10) Patent No.: US 7,576,023 B2
(45) Date of Patent: Aug. 18, 2009

(54) NAPHTHA DESULFURIZATION WITH SELECTIVELY SUPPRESSED HYDROGENATION

(75) Inventors: Garland B. Brignac, Clinton, LA (US); Michele S. Touvelle, Media, PA (US); Randolph J. Smiley, Hellertown, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 139 days.

(21) Appl. No.: 11/103,002

(22) Filed: Apr. 11, 2005

(65) Prior Publication Data

US 2005/0187100 A1 Aug. 25, 2005

Related U.S. Application Data

(63) Continuation of application No. 10/375,813, filed on Feb. 27, 2003, now Pat. No. 6,893,554.

(60) Provisional application No. 60/364,271, filed on Mar. 13, 2002.

(51) Int. Cl.
*B01J 38/56* (2006.01)
*B01J 38/08* (2006.01)
*B01J 23/00* (2006.01)

(52) U.S. Cl. .................... 502/31; 502/54; 502/305; 502/313

(58) Field of Classification Search .................. 502/31, 502/54, 305, 313
See application file for complete search history.

(56) References Cited

U.S. PATENT DOCUMENTS

| 2,761,817 | A | * | 9/1956 | Sweetser et al. | 208/216 R |
| 4,020,119 | A | * | 4/1977 | Johnson et al. | 585/259 |
| 4,381,993 | A | * | 5/1983 | Nevitt | 208/217 |
| 6,120,679 | A | * | 9/2000 | Hatanaka et al. | 208/217 |
| 6,218,333 | B1 | * | 4/2001 | Gabrielov et al. | 502/216 |
| 6,753,291 | B2 | * | 6/2004 | Eijsbouts et al. | 502/216 |

* cited by examiner

*Primary Examiner*—Patricia L Hailey

(57) ABSTRACT

Naphtha is selectively hydrodesulfurized in the presence of a sulfided, treated catalyst comprising at least a Group VIB metal catalytic component, to produce sulfur-reduced naphtha with reduced olefin loss due to saturation. The catalyst is treated with hydrogen, a selectively deactivating agent which deactivates its hydrogenation activity, and a protective agent which preserves its hydrodesulfurization activity during the treatment.

6 Claims, 3 Drawing Sheets

NAPHTHA DESULFURIZATION WITH SELECTIVELY SUPPRESSED HYDROGENATION

CROSS REFERENCE TO RELATED APPLICATION

This application is a continuation of U.S. patent application Ser. No. 10/375,813 filed on Feb. 27, 2003 now U.S. Pat. No. 6,893,554, which claims benefit of U.S. Provisional Patent Application Ser No. 60/364,271 filed on Mar. 13, 2002.

FIELD OF THE INVENTION

The invention relates to desulfurizing naphtha over a catalyst having selectively suppressed hydrogenation activity. More particularly the invention relates to hydrodesulfurizing naphtha over a sulfided naphtha desulfurization catalyst, treated to selectively decrease its olefin saturation activity.

BACKGROUND OF THE INVENTION

Low sulfur motor gasoline (mogas) requires the production of low sulfur blend stocks for the mogas pool. The primary blend stocks are derived from cat cracked (e.g., FCC) naphthas, which in addition to unwanted organic sulfur compounds, are rich in olefins desirable for meeting high octane rating requirements. The naphtha is reacted with hydrogen in the presence of a sulfided hydrodesulfurization catalyst, which forms $H_2S$ and a sulfur-reduced naphtha. The $H_2S$ is separated from the sulfur-reduced naphtha, which is then used for mogas. Such catalysts are known and typically contain a catalytic component of at least one Group VIB metal, and more often a mixture of non-noble Group VIII and Group VIB metals. In addition to having catalytic activity for removing sulfur and other heteroatoms, these naphtha hydrodesulfurization catalysts have hydrogenation activity, which saturates the desirable olefins.

Selective one and two-stage hydrodesulfurization processes have been developed to avoid olefin saturation and concomitant octane loss. Some processes use catalysts that have been at least partially deactivated by coke formation or by the use of inhibitors in order to decrease the olefinic saturation that accompanies desulfurization. However, the partial deactivation also substantially reduces the sulfur removal activity of the catalyst, which is undesirable. Other naphtha processes use catalysts made with metal compounds, which selectively and permanently poison hydrogenation sites. The hydrogenation activity of these catalysts cannot be restored, even with regeneration. Such processes are disclosed, for example, in U.S. Pat. Nos. 5,286,373; 5,525,211; 5,423,975; 5,985,136 and 6,231,754. There is a need for a naphtha desulfurization process using a catalyst whose olefinic saturation (hydrogenation) activity has been selectively suppressed, without substantially reducing its hydrodesulfurization activity. A further process improvement would result if this selective suppression could be achieved with the catalyst on-line in a reactor. Such one-line, selective suppression could be accomplished without the need for taking the reactor off-line, removing the catalyst, treating the catalyst, recharging the reactor, and then restarting the naphtha desulfurization process.

SUMMARY OF THE INVENTION

The invention relates to selectively desulfurizing a naphtha containing sulfur and unsaturates with reduced octane number loss and hydrogen consumption resulting from saturation by hydrogenation. The invention is based in part on the discovery of a catalyst having activity for hydrodesulfurization and hydrogenation, but whose hydrodesulfurization selectivity has been increased. The hydrogenation activity of the catalyst is selectively reduced or suppressed by a treatment which comprises contacting the catalyst with (i) hydrogen, (ii) at least one selectively deactivating agent that reduces the hydrogenation activity of the catalyst, and (iii) a protective agent that protects and preserves the hydrodesulfurization or sulfur removal activity of the catalyst, during the treatment. Hydrodesulfurization selectivity as used herein refers to the hydrodesulfurization activity expressed in terms of a kinetic rate constant (such as Relative Catalyst Activity or "RCA") divided by the hydrogenation activity expressed in the same way. As used herein, hydrogenation selectivity is the reciprocal of the hydrodesulfurization selectivity. The hydrogen, selectively deactivating agent, and protective agent may be present as a mixture. Thus, the hydrogenation activity of the catalyst is suppressed or reduced, while preserving the hydrodesulfurization activity. The method is applicable to a catalyst that has been, and is, on-stream in a reactor, to a fresh catalyst, and to a regenerated catalyst. The catalyst treatment is applied to a sulfided catalyst, and may be conducted at the same conditions of temperature and pressure being used for naphtha sulfur removal. Such an embodiment would be advantageous for treating a catalyst in situ, in a naphtha desulfurization reactor, since there would be no need to alter the reaction conditions when treating the catalyst instead of removing sulfur from the feed. By sulfur removal is meant that a naphtha feed containing organic sulfur compounds is reacted with hydrogen in the presence of the catalyst, to produce $H_2S$ and a naphtha reduced in sulfur. The $H_2S$ can be separated from the sulfur-reduced naphtha.

The catalyst comprises a composite of a catalytic component of at least one Group VIII metal and a support component. Non-noble Group VIII metals are preferred. The catalyst preferably comprises a composite of a catalytic component of at least Group VIII metal and at least one Group VIB metal, supported on a refractory inorganic oxide support. Total catalytic metal loadings of less than 12 wt. %, based the weight of the catalytic metal oxide(s) prior to sulfiding, are preferred. Particularly preferred is a low metal loaded catalyst comprising CoO and $MoO_3$, and a support component comprising at least one of alumina, silica and silica-alumina. The catalyst may be presulfided or it may be sulfided in situ in a naphtha desulfurization reactor using, for example, conventional sulfiding procedures.

The one or more selectively deactivating agents used in the catalyst treatment will comprise hydrocarbon species having olefinic unsaturation. Representative species include, for example, diolefins ("dienes"), triolefins, and aromatic unsaturates having olefinic unsaturation. Illustrative, but non-limiting examples of such hydrocarbons include, for example, cyclic alkyldienes such as dicyclopentadienes and cyclopentadienes, styrenes, vinyl toluenes, indenes, non-cyclic alkyldienes and the like. Mixtures of such hydrocarbons, at a total concentration found effective for the catalyst treatment, are found in thermally cracked naphtha and thermally cracked naphtha may therefore be used during the treatment, to provide these hydrocarbons. Representative thermally cracked naphthas include, for example, steam cracked naphtha, coker naphtha, visbreaker naphtha, VGO thermal cracker naphtha, and mixtures thereof. After the treatment, all or some of these selectively deactivating agents (such as reactive, unsaturated hydrocarbons) used for suppression of the catalytic hydrogenation activity, may continue to be present during subsequent sulfur removal. However, their concentration will be substantially less (e.g., 50%) than that used during the treatment. Otherwise, the sulfur removal activity of the catalyst may be rapidly reduced to the level of an aged and/or coked catalyst. In addition to the selectively deactivating agent(s), the catalyst is treated with at least one protective agent.

Protective agents are useful for protecting and preserving the sulfur removal activity of the catalyst during the treatment and include species that adsorb to the catalyst and can be subsequently desorbed. Representative species include, for example, CO, CO2, amines such as ethanolamine, and aqueous amines such as aqueous ethanolamine. During catalyst treatment, the protective agent protects the catalyst's heteroatom removal functionality from permanent deactivation by the selectively deactivating agent. At the conclusion of catalyst treatment, the concentration of the protective agent is decreased in order to at least partially restore the catalyst's heteroatom removal activity. The protective agent does not protect the catalyst's hydrogenation functionality. Consequently, the hydrogenation functionality is permanently deactivated. In other words, the hydrogenation activity is not restored when the concentration of the protective agent is decreased.

Without the presence of a protective agent, the catalyst's sulfur removal activity would be irreversibly deactivated by the selectively deactivating agent. During the catalyst treatment, the protective agent protects the catalyst's heteroatom removal activity. However, this protection may be accompanied by an inhibition of the catalyst's heteroatom removal activity. As discussed, inhibition of the catalyst's heteroatom removal activity during feed desulfurization (i.e., after treatment) would be undesirable. Consequently, a desirable protective agent is one that results in a decrease in the catalyst's heteroatom removal activity during treatment only. At the conclusion of catalyst treatment, the catalyst's heteroatom removal activity would be then substantially restored by discontinuing the use of the protective agent, or by decreasing its concentration to a level that has no inhibiting effect on the heteroatom removal activity. Thus, after the treatment, the use of the protective agent is discontinued, or reduced to a concentration too low to suppress the heteroatom removal activity. Discontinuing or reducing the concentration of the protective agent should restore at least a portion, preferably most, and more preferably substantially all of the heteroatom removal activity exhibited by the catalyst, prior to the treatment.

In one embodiment, the catalyst to be treated is a fresh, meaning freshly sulfided, catalyst. Suitable catalysts include deactivated and partially deactivated catalysts that have had their catalytic activity restored by, for example, regeneration and sulfiding. In another embodiment, the catalyst to be treated is a "used" catalyst, i.e., a catalyst that has been used for hydrocarbon heteroatom removal for a period of time, including catalysts that have been used "on-oil" under catalytic hydrotreating conditions. In yet another embodiment, the catalyst to be treated may be partially deactivated catalyst, for example, one that has lost a portion of its activity for heteroatom removal. The catalyst to be treated may comprise mixtures of fresh, used, and partially deactivated catalyst.

In one embodiment, the treatment is conducted ex situ of the hydrodesulfurization reactor, and, in another, embodiment the treatment is conducted in situ. The treatment may be conducted in a single step, where the protective agent and selectively deactivating agent are both present under treatment conditions. In another embodiment, the treatment is conducted in successive steps, where the protective agent is introduced, the selectively deactivating agent is introduced, and then the protective agent is removed following deactivation of the hydrogenation sites. In another embodiment, the treatment is conducted in situ in response to changes in the hydrodesulfurization process feed composition, reaction conditions, or both. In this embodiment, the treatment may be employed, for example, as a method for regulating aspects of the hydrodesulfurization process, such as product heteroatom content, product octane number. Such regulation may permit desirable adjustments of process parameters such as temperature, hydrogen consumption, space velocity, and pressure. The treatments may be repeated as needed.

DETAILED DESCRIPTION

The invention relates to a method for selectivating bifunctional catalysts. More specifically, a catalyst having activity for both heteroatom removal and hydrogenation activity can be treated to suppress the undesirable hydrogenation activity with little or not loss of desirable heteroatom removal activity. The catalyst treatment involves contacting the catalyst with (i) hydrogen, (ii) at least one selectively deactivating agent that reduces the hydrogenation activity of the catalyst, and (iii) at least one protective agent that protects and preserves the heteroatom removal activity of the catalyst during the treatment. At the conclusion of the treatment, the concentrations of selectively deactivating agent and protective agent are decreased, resulting in a treated catalyst effective for feed heteroatom removal with decreased activity for hydrogenation of the feed's unsaturated species.

Figure 4:
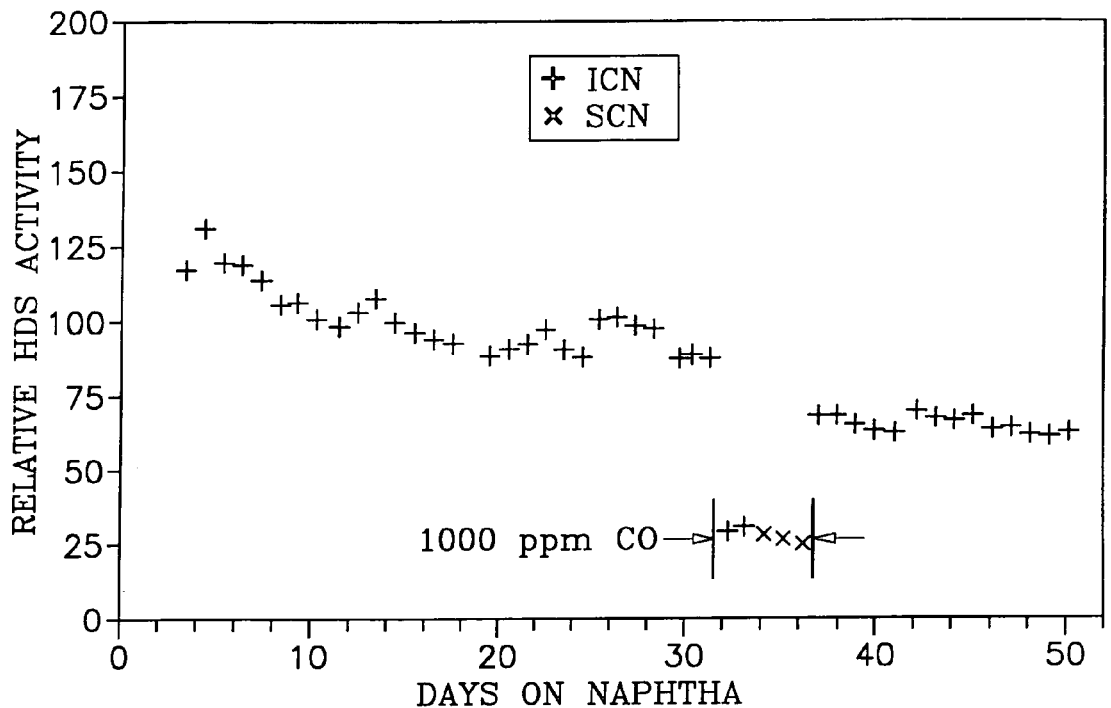
FIG. 4 illustrates the selective deactivation of hydrodesulfurization activity from thermally cracked naphtha.

In one embodiment, the catalyst treatment can be applied to a catalyst in situ in a reactor, and even while the reactor is on-line removing sulfur from a naphtha feed that contains organic sulfur compounds and olefinic unsaturates. In situ treating can be conducted by temporarily adding to the feed and/or hydrogen passing into the catalyst-containing reactor operating at naphtha hydrodesulfurization conditions, the selectively deactivating agent along with the protective agent. After the desired degree of hydrogenation activity suppression is achieved, addition of the protective agent and selectively deactivating agent ceases. This will result in the restoration of at least most (more than 50% and preferably at least 75%), and in some cases all, of the sulfur removal activity of the catalyst. For example, complete restoration of the hydrodesulfurization activity of a fresh or new sulfided naphtha hydrodesulfurization catalyst, of the type used in the examples below, occurred after the catalyst had been treated. After a similar catalyst that had been on-stream hydrodesulfurizing a cat naphtha feed had been treated, about 80% of its desulfurization activity was restored, as shown in FIG. 4 and Example 3 below. The sulfur removal reaction then continues in the reactor, with a treated catalyst that now has a higher selectivity for sulfur removal. The catalyst treatment selectively decreases the hydrogenation activity; consequently the catalyst has decreased selectivity for olefin saturation.

In another embodiment, all or a portion of the sulfur-containing naphtha feed conducted to the reactor may be temporarily switched to a different naphtha or other feed, while the protective agent and selectively deactivating agent are introduced into the reactor. In either embodiment, hydrogen should be present during selective deactivation to prevent a permanent loss of a substantial amount of the catalyst's hydrodesulfurization activity.

The catalyst treatment is achieved by adding the protective agent (e.g., CO) and one or more selectively deactivating agents to the naphtha feed entering the reactor, for a treatment time sufficient to decrease the hydrogenation activity, and thereby increase the HDS/OS selectivity ratio of the catalyst. The treatment time ranges from about one hour to few days. The catalyst treatment process can be conducted ex situ of, or in situ in a hydrodesulfurization reactor. While hydrodesulfurization conditions are suitable for the treatment, different conditions of temperature, pressure, space velocity, etc. than used for the naphtha hydrodesulfurization may be employed.

While not wishing to be held to any particular theory, it is believed that during the catalyst treatment, the selectively deactivating agent produces coke on the catalytic hydrogenation sites, thereby deactivating those sites. However, the catalyst sites active for sulfur removal are not permanently deactivated, since the protective agent protects those sites from the selectively deactivating agent. Thus, it is believed that the presence of the protective agent prevents coking and concomitant deactivation of the sulfur removal sites, while the hydrogenation sites are being deactivated. It has been discovered that the catalyst's hydrogenation activity is permanently attenuated following treatment, but the catalyst's hydrodesulfurization activity can be at least partially restored by removing the protective agent.

The amount of hydrogen present during the treatment will be an amount sufficient to prevent permanent deactivation of the catalyst for hydrodesulfurization. When sufficient hydrogen is employed, the catalyst's hydrodesulfurization activity can be restored by removing the protective agent. The amount of protective agent present during treatment is an amount effective to protect the catalyst's hydrodesulfurization sites from a substantial, permanent deactivation in the presence of the selectively deactivating agent under treatment conditions. The amount of selectively deactivating agent present during treatment will be an amount effective for permanent and substantial attenuation of the catalyst's hydrogenation activity.

The amount of (i) hydrogen, (ii) protective agent, such as CO, and (iii) selectively deactivating agent present during the treatment in an on-oil or on-stream mode, may respectively range from (a) about 15 to about 1500 psia hydrogen partial pressure at the reactor outlet during treatment (b) about 0.0015 psia to about 15 psia partial pressure of protective agent and (c) about 0.004 to about 40 psia partial pressure of selectively deactivating agent. When another protective agent such as $CO_2$ or ethanol amine is employed, the desired partial pressure can be conventionally obtained by direct comparison of that agent's vapor pressure to CO's. By treat gas is meant all hydrogen or a mixture of hydrogen and inert species which do not effect the treatment or sulfur removal processes, but serve merely as a diluent for the hydrogen, such as nitrogen, methane, ethane and the like. The amount of hydrogen in the gas will typically be at least 60 vol. % and preferably at least 75 vol. %.

A carrier hydrocarbon acting as a diluent for the selectively deactivating agent may be employed. For in situ treatment, the carrier hydrocarbon may, for example, comprise the naphtha being passed into the reactor, to be desulfurized. For example, during naphtha desulfurizing, the catalyst may be treated in situ in the reactor by conducting to the reactor the naphtha feed, hydrogen treat gas, the protective agent, and an effective or deactivating amount of the selectively deactivating agent. In this case, the naphtha feed comprises the carrier hydrocarbon. In another example, in which all or a portion of a cat cracked naphtha feed being desulfurized is switched to a thermally cracked naphtha as the source of the selectively deactivating agent, the carrier hydrocarbon comprises a mixture of cat and thermally cracked naphtha, or all thermally cracked naphtha. When thermally cracked naphtha is the selectively deactivating agent, and a hydrocarbon carrier is employed, all or a portion of the hydrocarbon carrier may comprise one or more light hydrocarbons such as naphtha, light oil, etc. Any suitable hydrocarbon may comprise the carrier hydrocarbon. When employed, a hydrocarbon carrier will typically and preferably be used for a treatment in situ in a sulfur removal reactor. In an embodiment in which the catalyst is treated in a separate vessel, ex situ of the reactor, use of a hydrocarbon carrier would be optional.

The protective agent prevents permanent deactivation of the sulfur removal activity during the treatment. Suitable protective agents include one or more species that adsorb to the catalyst and can be subsequently desorbed. Representative species include, for example, CO, CO2, amines such as ethanolamine, and aqueous amines such as aqueous ethanolamine. The protective agent may be in the gas or liquid phase, but is preferably a gas or vapor at the treatment conditions for vapor phase reactions. In one embodiment, the protective agent is chosen so that the decrease in heteroatom-removal activity under treatment conditions exceeds the hydrogenation activity loss, and where the protective agent is removable for restoring at least a portion of the catalyst's hydrodesulfurization activity. In another embodiment, the protective agent is chosen so that the decrease in heteroatom-removal activity under treatment conditions is less than the decrease in hydrogenation activity, and where the protective agent is removable for restoring at least a portion of the catalyst's hydrodesulfurization activity.

The selectively deactivating agent reduces the hydrogenation activity of the catalyst in the presence of the protective agent. The selectively deactivating agent generally comprises one or more hydrocarbon species having olefinic unsaturation. These selectively deactivating agents will be present during the treatment in a concentration substantially greater (e.g., >50%) than any that may be present in the naphtha feed being reduced in sulfur and would, but for the protective agent, permanently reduce the catalyst's heteroatom removal activity during the treatment. Preferably at least a portion of the selectively deactivating agent will have greater reactivity with hydrogen than the predominant olefins in the feed, which it is desired to preserve during the heteroatom removal. As with the protective agent, the selectively deactivating agent is preferably gas or vapor for vapor phase reactions. Representative selectively deactivating agents contain diolefins ("dienes"), triolefins, and aromatic unsaturates having olefinic unsaturation. For example, cyclic alkyldienes such as dicyclopentadienes and cyclopentadienes, styrenes, vinyl toluenes, indenes, noncyclic alkyldienes and the like can be used as selectively deactivating agents, either alone or in combination. Such species may be found, for example, in thermally cracked naphthas. In the examples below, which are specific to hydrodesulfurizing cat cracked naphtha, the feed to the reactor was switched from a fluid cat cracked (FCC) naphtha, to a thermally cracked naphtha, along with CO as a protective agent. The amount of hydrogen present was about the same. An increase in the HDS/OS selectivity ratio of the hydrodesulfurization catalyst was observed. Following treatment for an effective treatment time, the concentration of thermally cracked naphtha and CO in the reactor feed were decreased, and the amount of hydrogen treat gas and FCC naphtha in the reactor feed was increased. A 20-70% increase in HDS selectivity after the treatment was experienced with the catalyst used for the naphtha desulfurization in the examples below.

Naphtha hydrodesulfurization may be conducted in one or more reaction stages and typically one or two. While more than one stage may be located within a single reactor vessel, more typically each stage will constitute a separate vessel. More than one reactor vessel may be used for a single stage. For a vapor phase reaction, the feed will be in the vapor state at least at the end of the reaction. Thus, while all or a portion of the feed may enter a reaction stage in the liquid state, the hydrodesulfurized naphtha effluent from each stage is all vapor, and this is what is meant by vapor phase reaction stage. For a mixed phase reaction stage, a portion of the desulfurized naphtha effluent will be in the liquid state and a portion in the vapor state, at the end of the reaction. It is preferred that the desulfurized naphtha effluent from each stage be all vapor. The naphtha conducted into each stage will be mostly, and preferably all vapor. More preferably, the naphtha feed for all stages is all vapor. The amount of reaction hydrogen fed into each of the one or more stages is greater than the amount consumed by the reaction. The effluent from each stage comprises a mixture of $H_2S$, sulfur-reduced naphtha, unreacted hydrogen and minor amounts of hydrocarbons boiling below the naphtha range, produced during the reaction. In the case of more than one reaction stage, the $H_2S$ is removed or separated from the hydrodesulfurized naphtha effluent of each stage, before it is passed into the next stage. This distinguishes the term "stage" from a reaction "zone". The feed for a reaction zone comprises the entire effluent from an upstream zone, including the sulfur reduced naphtha, the $H_2S$, the unreacted hydrogen and lower boiling reaction products from the upstream zone. Each stage may comprise more than one reaction zone, with each zone being defined by at least one catalyst bed.

Although a hydrodesulfurization catalyst treated as set forth herein will selectively hydrodesulfurize a sulfur and olefin-containing naphtha, any sulfur-containing naphtha that contains organic sulfur compounds may be hydrodesulfurized with the treated catalyst, even one that contains little or no olefins. By "naphtha" it is meant a hydrocarbon boiling in the naphtha boiling range, i.e., one boiling in the range of about $C_4$ to about 500° F. Sulfur and olefin-containing naphthas that may be selectively hydrodesulfurized include full range, light, intermediate and heavy naphthas derived from petroleum, tar sand bitumen, shale oil and the like. This includes thermally cracked naphthas, coker naphthas, FCC naphthas and blends and fractions thereof, with end boiling points typically below 450° F., and which typically contain 60 vol. % or less olefinic hydrocarbons, with sulfur levels as high as 7000 wppm and even higher. The naphtha feed, preferably a cracked naphtha feedstock, generally contains not only paraffins, naphthenes and aromatics, but also olefinic unsaturates, such as olefins, and aromatic and cyclic hydrocarbons with olefinic side chains. The olefin content of a typical cracked naphtha feed can broadly range from 5-60 vol. %, but more typically from 10-40 vol. %. The sulfur content of a naphtha is typically less than 1 wt. %, and ranges from as low as 0.002 wt. %, up to as much as about 0.7 wt. %, based on the total feed composition. Selective hydrodesulfurization conditions broadly include a temperature of 390-750° F., a pressure of 50-1,000 psig, a liquid hourly space velocity of 0.1-10 LHSV and a hydrogen or hydrogen-containing treat gas rate of 500-10,000 SCF/B. Preferred conditions include 450-750° F., 60-600 psig, 2-7 LHSV and 1,000-4,000 SCF/B. Still more preferred are 500-650° F., 50-5,000 psig, and 1,000-3,000 SCF/B.

The hydrodesulfurization catalyst will comprise a composite of a catalytic component of at least a Group VIB and VIII metal, preferably a non-noble metal, such as Co, Ni and Fe. Catalyst metal loading is not critical and, for example, may be as high as about 1 to about 30 wt. % or higher, based on the total weight of the catalyst. The catalyst may further comprise an inorganic refractory oxide support component.

In one embodiment, the catalyst to be treated is a selective naphtha hydrodesulfurization catalyst. For such catalysts, the amount of catalytically active metal component(s) will preferably be no more, and more preferably less, than 12 wt. % of the total catalyst composition, based on the weight of the one or more catalytically active metals calculated as the oxide. Preferably the catalyst will comprise a catalytic component of at least one non-noble metal from Group VIII, in combination with a catalytic component of at least one metal from Group VIB, supported on a suitable, high surface area inorganic refractory oxide support material such as, but not limited to, alumina, silica, titania, magnesia, silica-alumina, and the like. Alumina, silica and silica-alumina are preferred. All Groups of the Periodic Table referred to herein mean Groups as found in the Sargent-Welch Periodic Table of the Elements, copyrighted in 1968 by the Sargent-Welch Scientific Company. In contrast to the low catalytic metal loaded catalysts, catalytic metal component concentrations in conventional hydroprocessing catalysts and typically range from about 12-30 wt. % of the metal oxide, and more typically from about 15-25 wt. % of the oxide of the catalytic metal components, based on the total catalyst weight. As mentioned above, the catalyst may be presulfided or sulfided in situ, by well known and conventional methods.

A low metal loaded hydrodesulfurization catalyst comprising CoO and $MoO_3$ on a support and having a Co/Mo atomic ratio of from 0.1 to 1.0 is particularly preferred. By low metal loaded is meant that the catalyst will contain not more than 12, preferably not more than 10 and more preferably not more than 8 wt. % catalytic metal components calculated as their oxides, based on the total catalyst weight. Such catalysts include: (a) a $MoO_3$ concentration of about 1 to 10 wt. %, preferably 2 to 8 wt. % and more preferably 4 to 6 wt. % of the total catalyst; (b) a CoO concentration of 0.1 to 5 wt. %, preferably 0.5 to 4 wt. % and more preferably 1 to 3 wt. % based on the total catalyst weight. The catalyst will also have (i) a Co/Mo atomic ratio of 0.1 to 1.0, preferably 0.20 to 0.80 and more preferably 0.25 to 0.72; (ii) a median pore diameter of 60 to 200 Å, preferably from 75 to 175 Å and more preferably 80 to 150 Å; (iii) a MoO surface concentration of $0.5 \times 10^{-4}$ to $3 \times 10^{-4}$ g. $MoO_3/m^2$, preferably $0.75 \times 10^{-4}$ to $2.4 \times 10^{-4}$ and more preferably $1 \times 10^{-4}$ to $2 \times 10^{-4}$, and (iv) an average particle size diameter of less than 2.0 mm, preferably less than 1.6 mm and more preferably less than 1.4 mm. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity," S. J. Tauster, et al., J of Catalysis, 63, p. 515-519 (1980), which is incorporated herein by reference. The Oxygen Chemisorption Test involves edge-plane area measurements made wherein pulses of oxygen are added to a carrier gas stream and thus rapidly traverse the catalyst bed. The metal sulfide edge plane area of the catalyst, as measured by the oxygen chemisorption, will be from about 761 to 2800, preferably from 1000 to 2200, and more preferably from 1200 to 2000 μmol oxygen/gram $MoO_3$. Alumina is a preferred support. The supported, low metal loaded Co and Mo containing catalyst used in the example and comparative examples below, met at least the broad ranges of all the catalyst parameters for the low metal loaded catalyst set forth in this paragraph. For catalysts with a high degree of metal sulfide edge plane area, magnesia can also be used. The catalyst support material will preferably contain less than 1 wt. % of contaminants such as Fe, sulfates, silica and various metal oxides which can be present during preparation of the catalyst. It is preferred that the catalyst be free of such contaminants. In one embodiment, the catalyst may also contain from up to 5 wt. %, preferably 0.5 to 4 wt. %, and more preferably 1 to 3 wt. % of an additive in the support, which additive is selected from the group consisting of phosphorous and metals or metal oxides of metals of Group IA (alkali metals).

The one or more catalytic metals can be deposited or incorporated upon the support by any suitable conventional means, such as by impregnation employing heat-decomposable salts of the Group VIB and VIII metals or other methods known to those skilled in the art, such as ion-exchange, with impregnation methods being preferred. Suitable aqueous impregnation solutions include, but are not limited to a nitrate, ammoniated oxide, formate, acetate and the like. Impregnation of the catalytic metal hydrogenating components can be employed by incipient wetness, impregnation from aqueous or organic media, compositing. Impregnation as in incipient wetness, with or without drying and calcining after each impregnation is typically used. Calcination is generally achieved in air at temperatures of from 400-1200° F., with temperatures from 800-1100° F. typical.

The invention will be further understood with reference to the examples below.

EXAMPLES

In the examples below, the feeds for heteroatom removal were intermediate (ICN) and heavy (HCN) FCC cat naphthas, which contained sulfur compounds and olefins. The source of selectively deactivating agent was a thermally cracked naphtha (TCN), which also contained sulfur compounds and olefins. Both feeds contained selectively deactivating agent, with the concentration of the primary ones, which are those in the greatest concentration, almost five times greater in the thermally cracked naphtha. These primary selectively deactivating agents comprised reactive unsaturates which contained olefin unsaturates, including diolefins. An analysis of these reactive unsaturates and their amounts for the ICN and TCN are set forth in the Table below.

|  | ICN | TCN |
|---|---|---|
| Lighter Reactives |  |  |
| Hexadienes | 0.199 |  |
| mCPD* | 0.038 |  |
| Styrenes | 0.135 | 0.39 |
| DCPD** |  | 0.42 |
| 1,7-Octadiene |  | 0.44 |
| Total Light Reactives | 0.372 | 1.25 |
| Heavier Reactives |  |  |
| Indene | 0.096 | 0.76 |
| Vinyl Toluene | 0.1 | 0.19 |
| mDCPD*** | 0.13 | 1.09 |
| Total Heavier Reactives | 0.326 | 2.04 |
| Total Reactives | 0.696 | 3.29 |

*Methyl cyclopentadiene
**Dicyclopentadiene
***Methyl dicyclopentadiene

As shown in the Table, the TCN contains almost five times as much selectively deactivating agent, as does the ICN. Thus, the difference in reactive species between these two streams is more of amount, than the type of species present. Thus, it may be possible to increase the catalyst selectivity by adding only the protective agent to the cat naphtha or hydrogen treat gas. However, at these lower concentrations the time required for the treatment will be more on the order of weeks and months, and not the relatively few hours or days achieved by the instant process.

In all of the examples, a Co/Mo on alumina catalyst containing 4.5 wt. % $MoO_3$ and 1.2 wt. % CoO in 1.3 mm ASQ form was loaded into a fixed bed, isothermal downflow, pilot plant tubular reactor and activated in situ in the reactor. Catalyst activation was achieved using a 10 mole % $H_2S/H_2$ gas blend in a virgin naphtha, for approximately 14 hours at two holding temperatures, 400° F. (gas/liquid mixed phase) and 650° F. (all vapor phase), and with a reactor pressure of 300 psig. The reactor was then cooled to 200° F., before the introduction of the naphtha feed to be desulfurized.

Example 1

Figure 1:
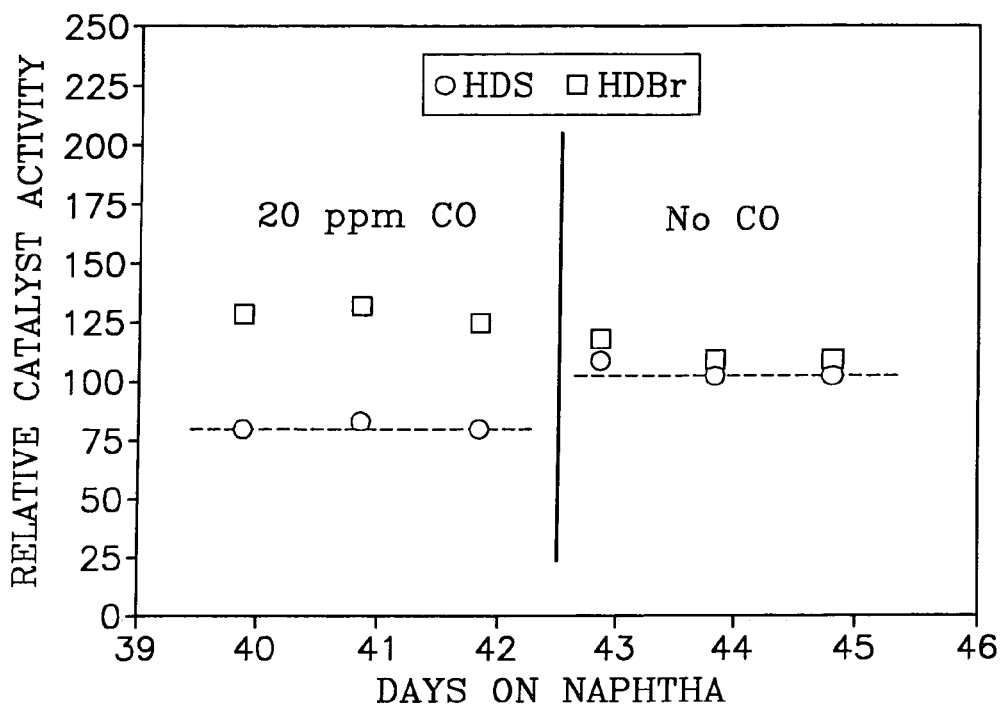
FIG. 1 is a graph showing reversible CO suppression of hydrodesulfurization activity of a catalyst having activity for both sulfur removal and hydrogenation.
Figure 2:
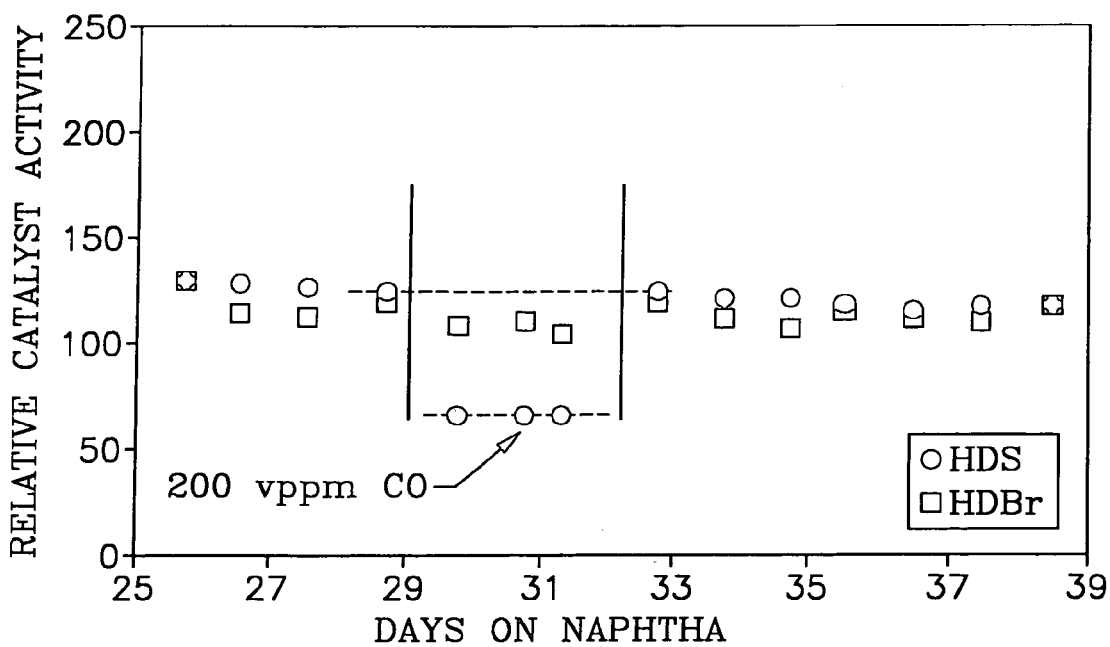
FIG. 2 graphically illustrates the effect of higher CO concentrations on the hydrodesulfurization activity.

The purpose of this experiment was to determine the effect that CO in the treat gas had on the HDS and HDBr activity of the naphtha hydrodesulfurization catalyst. By HDBr is meant olefin saturation (hydrogenation) activity, as measured by bromine number. The feed was an intermediate cat naphtha (ICN) having 1941 wppm total sulfur and a bromine number of 38. Test conditions included a temperature of 525° F., a total inlet pressure of 290 psig and a treat gas rate of 2000 SCF/B. The treat gas was 75 vol. % hydrogen, with the balance methane. The reactor was run with the ICN having 20 vppm CO in the treat gas, no CO in the treat gas and with 200 ppm CO in the treat gas. The results are shown in FIGS. 1 and 2.

For the first run, the reactor had been running with 20 vppm CO in the treat gas. After 42 days, the CO was removed from the gas. The results are shown in FIG. 1. The effect of the 20 vppm treat gas CO on the HDS and HDBr activity of the catalyst is apparent. The presence of the CO in the treat gas had significantly lowered the HDS activity. However, when the CO was removed from the treat gas, about a 20 increase in the HDS activity of the catalyst was observed. The presence of the CO had a much smaller effect on the HDBr activity.

In the second run, the reactor was run on-stream for 29 days, when 200 vppm of CO was added to the treat gas. This resulted in about a 45% loss of HDS activity, as shown in FIG. 2. As was the case for the first run, the CO had little effect on the HDBr or olefin saturation activity. After the 200 vppm of CO was removed from the gas, substantially full restoration of the HDS activity of the catalyst was observed. This restoration is shown for days 32-39 in FIG. 2.

Example 2

Figure 3:
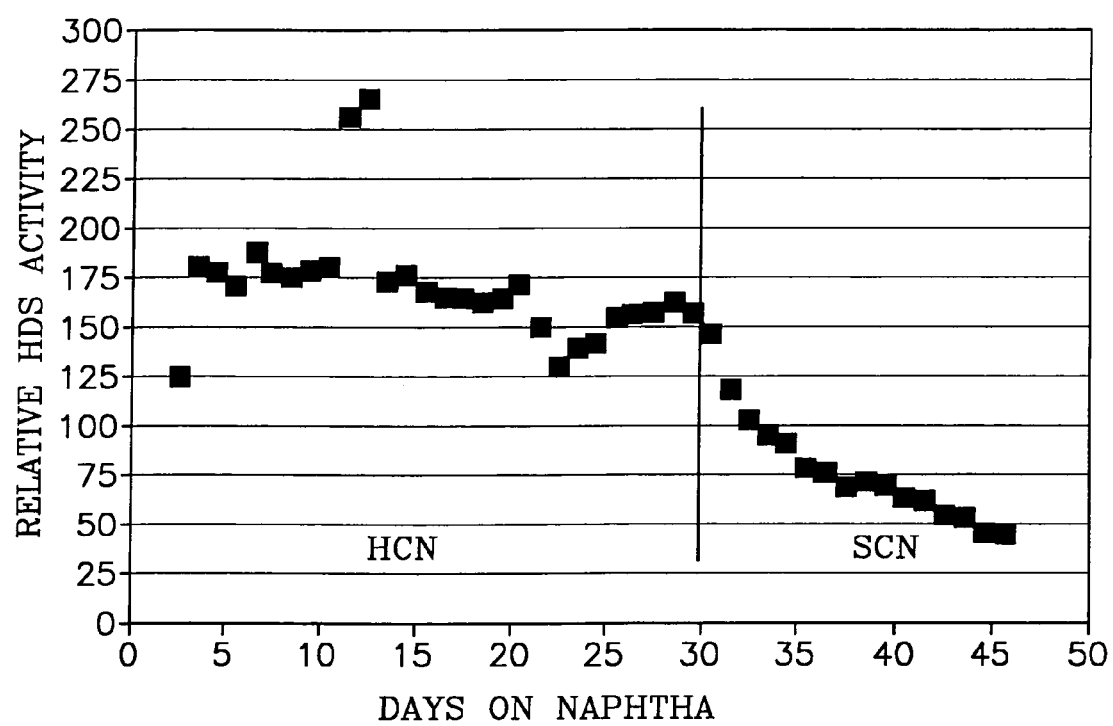
FIG. 3 is a plot showing rapid deactivation of hydrodesulfurization activity in the presence of thermally cracked naphtha.

In this example the feed was a heavy cat naphtha having a 162-475° F. boiling range, 229 wppm total sulfur and a bromine number of 19. The reaction conditions included a temperature of 525° F., a 200 psig total inlet pressure, a 100% hydrogen treat gas rate of 2000 SCF/B and a feed space velocity held constant at 3.0 LHSV. The pilot plant reactor was on-stream for about 30 days. As shown in FIG. 3, the HDS activity of the catalyst exhibited a moderate decline, typical for such a catalyst for the first days on the naphtha. At day 31, the feed was changed to a thermally cracked naphtha. The thermally cracked naphtha had 200 wppm of sulfur and a bromine number of 35.5. The reactor inlet pressure was raised to 225 psig and the space velocity reduced to a constant 2.0 LHSV for this feed, with all the other conditions remaining the same. The thermally cracked naphtha feed was run in the reactor from about day 31 to day 46. FIG. 3 shows the steep and rapid decline in the HDS activity of the catalyst while on the thermally cracked naphtha, as a result of the selectively deactivating agents in it.

Example 3

In this experiment, the naphtha feed was an intermediate cat naphtha having 3340 wppm total sulfur and a bromine number of 50.7, representing 32.8 vol. % feed olefins. The pilot plant reactor was on-stream desulfurizing the naphtha feed at conditions to achieve from 85-95 wt. % HDS. The conditions included a temperature which varied from 525-535-562° F., a total inlet pressure of 225 psig, 2000 SCF/B of a 100% hydrogen treat gas and a liquid hourly space velocity of from 2.5-4.5.

After 31 days of naphtha desulfurization, 1000 vppm of CO was added to the treat gas. This resulted in a substantial reduction of about 70% of the HDS activity of the catalyst. On the 34$^{th}$ day, the naphtha feed was switched from the ICN to a TCN feed, while maintaining the 1000 vppm of CO in the treat gas. The TCN and CO continued to be fed into the reactor, along with the treat gas, for three days, after which the CO was removed from the gas and the feed switched back to the ICN. This resulted in restoring about 80% of the HDS activity it had prior to the treatment. The three day catalyst treatment was conducted in the reactor at 525° F., 225 psig, a treat gas rate of 2000 SCF/B and a thermally cracked naphtha space velocity of 2.0 LHSV. After the three day treatment, the reactor was run at 562° F., 225 psig, 2000 SCF/B and an ICN space velocity of 4.5 LHSV.

Figure 5:
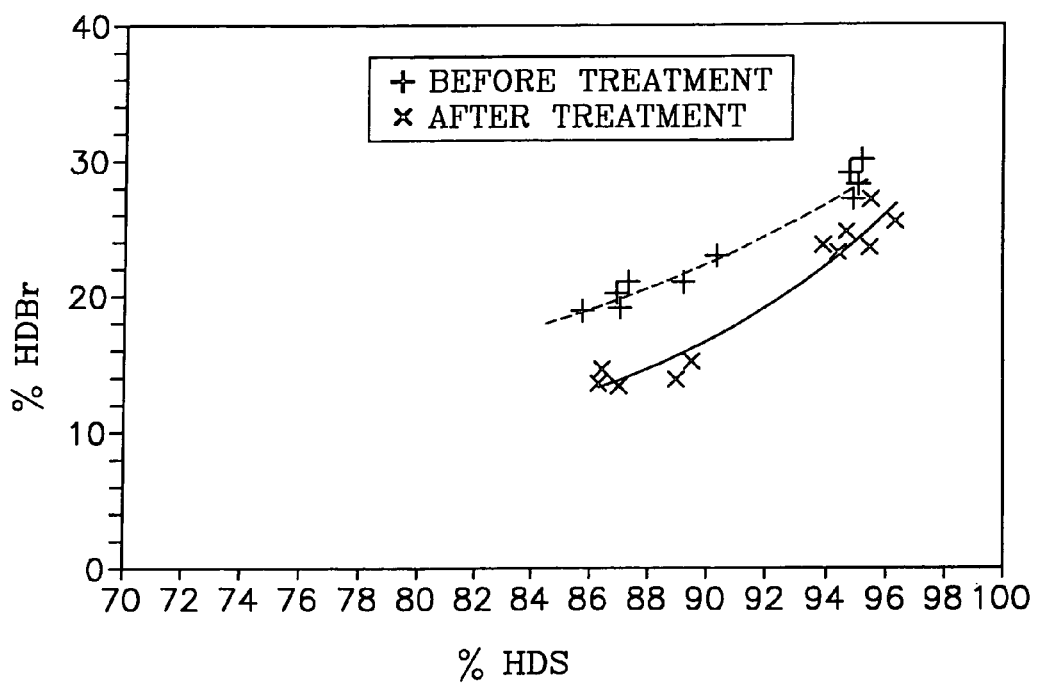
FIG. 5 is a graph showing the reduction in catalytic hydrogenation activity, as a function of the degree of desulfurization, after the catalyst treatment.

The reduction and recovery of the HDS activity is shown in FIG. 4. The "+" points refer to the ICN feed, while the "x" points indicate the temporary switchover to the TCN. The low activity + and x points for days 32-36 are a result of the presence of the 1000 ppm of CO in the hydrogen treat gas. The immediate drop and recovery of HDS activity as a function of the addition of the CO and then the removal of both the CO and TCN is apparent. It also clearly shows the about 80% recovery in HDS activity, following the catalyst treatment. FIG. 5 shows the relative % HDBr, as a function of the % HDS or desulfurization level, before and after the $H_2$—CO-thermally cracked naphtha treatment. Thus, before the treatment and at a reactor temperature of 535° F., the % HDBr ranges from about 19-24 at a corresponding % HDS of from about 86-91. After the treatment and at a reactor temperature of 562° F., over the same range of % HDS, the % HDBr ranges only from about 13-16. These results demonstrate that the effect of the treatment increased the HDS/OS selectivity primarily by reducing the olefin saturation activity of the catalyst, without a corresponding reduction in kind of the HDS activity.

The invention claimed is:

1. A catalyst activation method, comprising contacting a catalyst under catalyst activation conditions with (a) a hydrocarbon that contains naphtha boiling-range species, (b) at least one sulfur-containing species, and (c) a protective agent, wherein the catalyst consists of one or more metals, in oxide form, selected from Groups VIB and VIII of the Periodic Table of Elements, supported on an inorganic refractory oxide support material composed of silica, alumina, or silica-alumina.

2. The method of claim 1 wherein the hydrocarbon contains cracked naphtha.

3. The method of claim 1 wherein the sulfur-containing species is at least one of sulfur, organic sulfur, and hydrogen sulfide.

4. The method of claim 1 wherein the catalyst activation conditions comprise a temperature ranging from about 390° F. to about 750° F., a pressure of about 50 psig to about 1000 psig, and a liquid hourly space velocity of about 0.1 to about 10.

5. The method of claim 4 wherein the catalyst activation conditions farther comprise a treat gas rate of about 500 to about 10,000 scf/B.

6. The method of claim 1 wherein the protective agent is at least one of CO, $CO_2$, amine, and aqueous amine.

* * * * *